J. J. Diehl.
Potato Masher.
N° 93,862. Patented Aug. 17, 1869.

Witnesses:
Geo. W. Rothwell
Phil. P. Larner

Inventor:
Jacob J. Diehl
By Dodershena &
Attys

United States Patent Office.

JACOB J. DIEHL, OF YORK, PENNSYLVANIA.

Letters Patent No. 93,862, dated August 17, 1869.

IMPROVED KITCHEN-UTENSIL.

The Schedule referred to in these Letters Patent and making part of the same.

*To all whom it may concern:*

Be it known that I, JACOB J. DIEHL, of York, in the county of York, and State of Pennsylvania, have invented a new and useful Kitchen-Utensil; and I do hereby declare the following to be a full, clear, and exact description thereof, sufficient to enable those skilled in the art to which my invention appertains, to fully understand and use the same, reference being had to the accompanying drawings, forming part of this specification, and in which—

Figure 1:
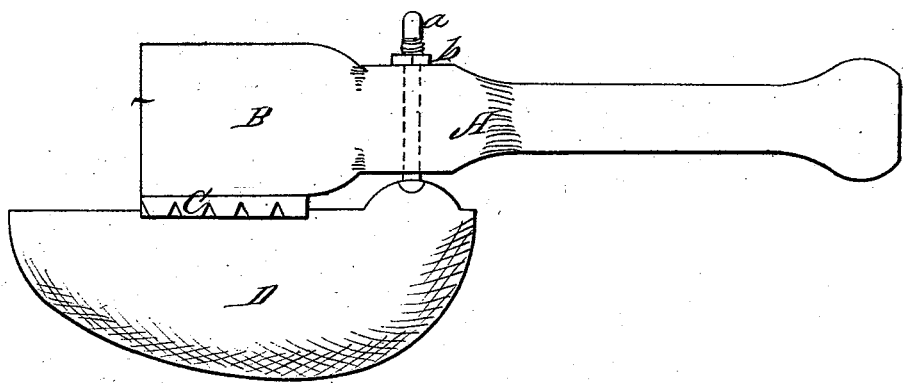
Figure 2:
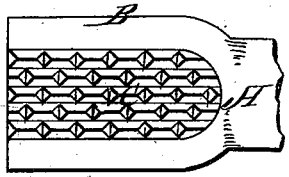

Figure 1 is a side view of the utensil complete, and Figure 2, a plan of the steak-pounder.

The subject of this invention is a new and useful article for kitchen-use, combining, in neat and compact form, a vegetable-masher, steak-pounder, and mincing-knife.

The masher is of ordinary form, and has, rigidly attached to it, a plate, or metallic block, provided with pyramidal teeth, composing the pounder.

The mincing-knife has a shank, which passes through the handle of the implement, and is fastened by a nut, or its equivalent, so as to be removable.

The nature of my invention will be fully understood by reference to the accompanying drawings, considered in connection with the following detail description.

Similar letters of reference indicate like parts in the two figures.

In the drawings—

A represents the handle of the implement formed with the vegetable-masher B, as usual.

C is a plate, or metallic block, formed with teeth, which are pyramidal, or have inclined sides. This plate or block is attached, in any suitable manner, to the masher B, and constitutes the steak-pounder.

The object in making the teeth with inclined sides, is to facilitate the operation of pounding meat, as the teeth, on account of their shape, will readily free themselves. This plate or block also renders the masher B heavier, and, therefore, increases its effect.

D is the mincing-knife, provided with a shank, *a*, which passes through the handle A. The back of the knife rests in a groove in the plate C, between two rows of the teeth, and is secured by a nut, *b*, screwed on to the shank *a*, or by equivalent means. This knife is preferably detached, when the implement is in use as a masher or pounder. In the former instance, however, that is, when used as a masher, the removal of the knife is not necessary.

It will be seen, that by this invention, an article is produced which takes the place of three distinct kitchen-requisites. It can be furnished at a small advance upon the cost of either a mincing-knife, pounder, or masher, as usually made, and will effect equally good results. It is always convenient, and occupies but little room.

I do not claim the combination of a cleaver and steak-pounder, as I am aware that such is not new; but having thus described my invention,

I claim as new, and desire to secure by Letters Patent—

1. The detachable cutter D, having a shank, *a*, which passes through the handle A, and is secured by a nut, said cutter being prevented from lateral movement by fitting into a space between the teeth of plate C, as herein described.

2. The kitchen-implement herein described, consisting of the vegetable-masher B, with handle A, the toothed metallic plate or pounder C, and the detachable cutter D, all constructed and arranged as set forth.

The above signed by me, this 20th day of February, 1869.

JACOB J. DIEHL.

Witnesses:
JOHN A. WIEDERSHEIM,
J. FRASER.